(12) United States Patent
Di Anna

(10) Patent No.: US 9,027,319 B1
(45) Date of Patent: May 12, 2015

(54) NUT TREE PICKUP AND DEBRIS SEPARATOR

(71) Applicant: Guiseppe Di Anna, Modesto, CA (US)

(72) Inventor: Guiseppe Di Anna, Modesto, CA (US)

(*) Notice: Subject to any disclaimer, the term of this patent is extended or adjusted under 35 U.S.C. 154(b) by 0 days.

(21) Appl. No.: 14/167,060

(22) Filed: Jan. 29, 2014

(51) Int. Cl.
*A01D 51/00* (2006.01)

(52) U.S. Cl.
CPC .............. *A01D 51/002* (2013.01); *A01D 51/00* (2013.01)

(58) Field of Classification Search
USPC ........................................... 56/328.1; 15/3.11
See application file for complete search history.

(56) References Cited

U.S. PATENT DOCUMENTS

| | | | |
|---|---|---|---|
| 490,596 A * | 1/1893 | Colgrove | 171/11 |
| 2,916,868 A | 12/1959 | Ramacher | |
| 3,182,437 A | 5/1965 | Ramacher | |
| 3,341,877 A * | 9/1967 | Ingalls | 15/3.11 |
| 3,462,929 A * | 8/1969 | Ingalls | 56/328.1 |
| 3,782,477 A * | 1/1974 | Fahrenholz | 171/12 |
| 3,872,657 A | 3/1975 | Ramacher et al. | |
| 4,167,975 A * | 9/1979 | Fahrenholz | 171/12 |
| 4,642,977 A | 2/1987 | Ramacher | |
| 5,001,893 A | 3/1991 | Stanley et al. | |
| 7,658,233 B1 * | 2/2010 | Aho et al. | 171/63 |

* cited by examiner

*Primary Examiner* — Alicia Torres
(74) *Attorney, Agent, or Firm* — R. Michael West

(57) ABSTRACT

A nut tree pickup and debris separator comprising three separate but serially interconnected stages, each including optimized structural and functional features for nut harvesting. The first stage includes a rotary pickup brush and an endless conveyor. The conveyor is constructed from a plurality of parallel bars with flights therebetween, the rods being arranged in spaced relation to retain nuts and pass debris. The second stage comprises an inclined rotating drum whose sidewall includes a plurality of elongated apertures passing therethrough, sized to retain nuts and pass debris. An inner side of the sidewall has a helical flight, sized, configured, and arranged to convey and tumble nuts and debris through the drum, with debris falling through the apertures. The third stage includes vertically offset, tandem conveyors and a cleaning fan to remove any remaining debris from the nuts as the stream falls from the end of one conveyor onto the other.

19 Claims, 7 Drawing Sheets

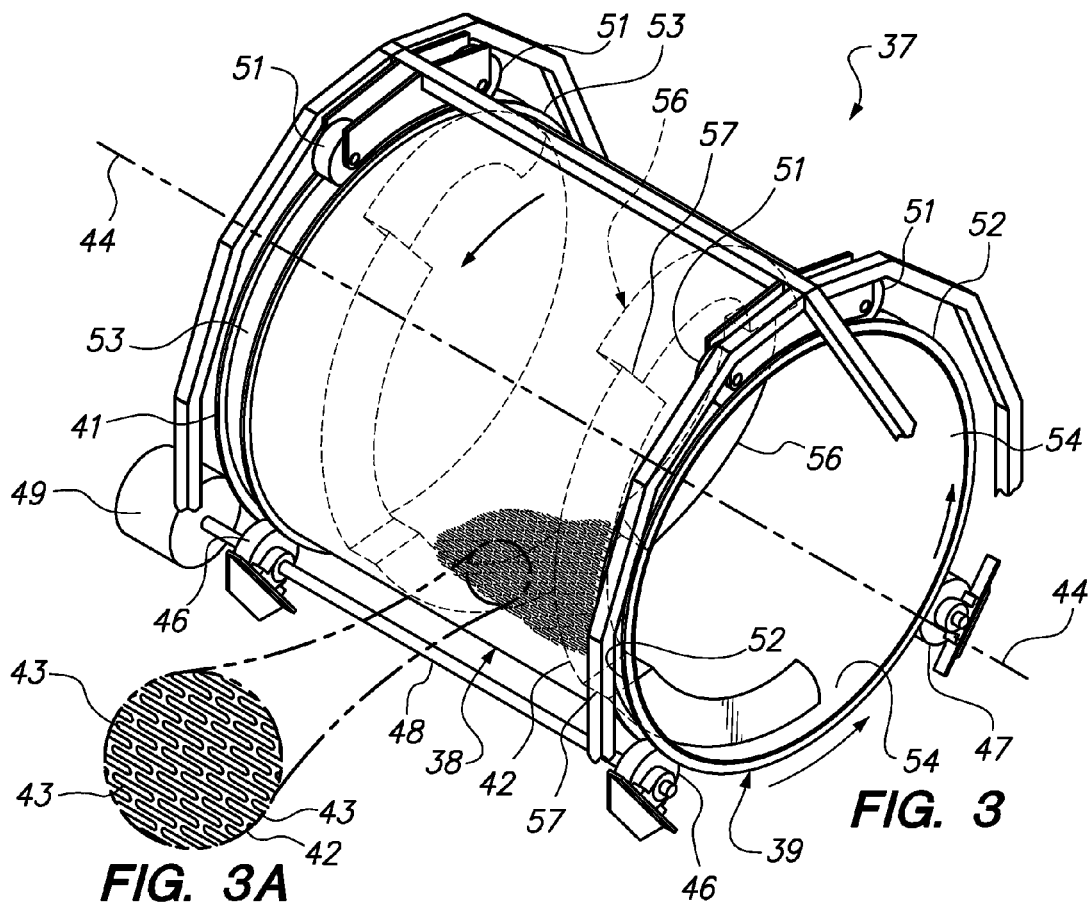
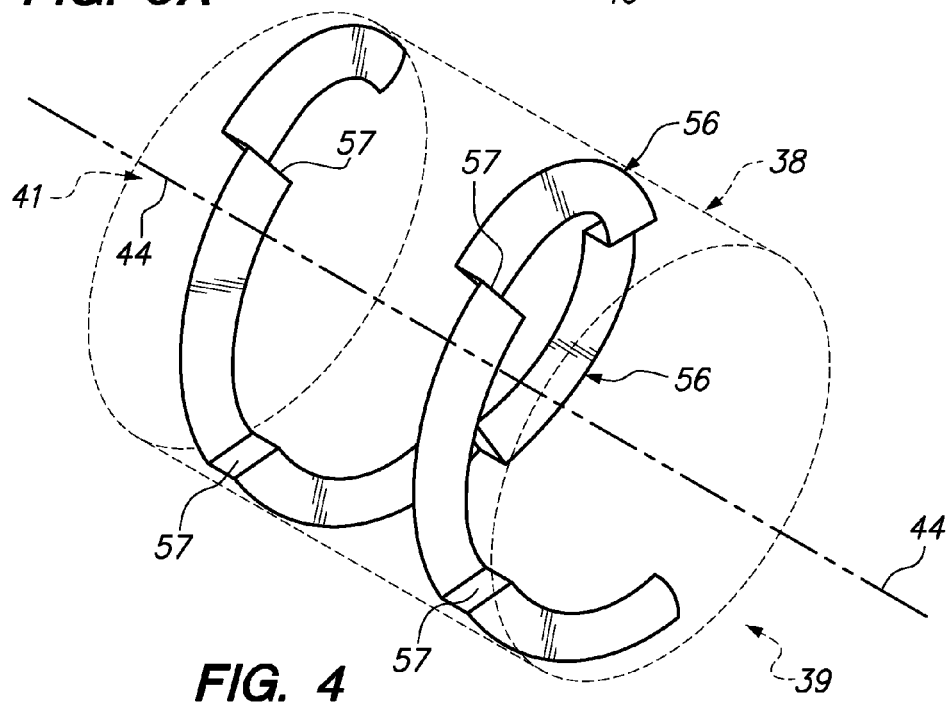

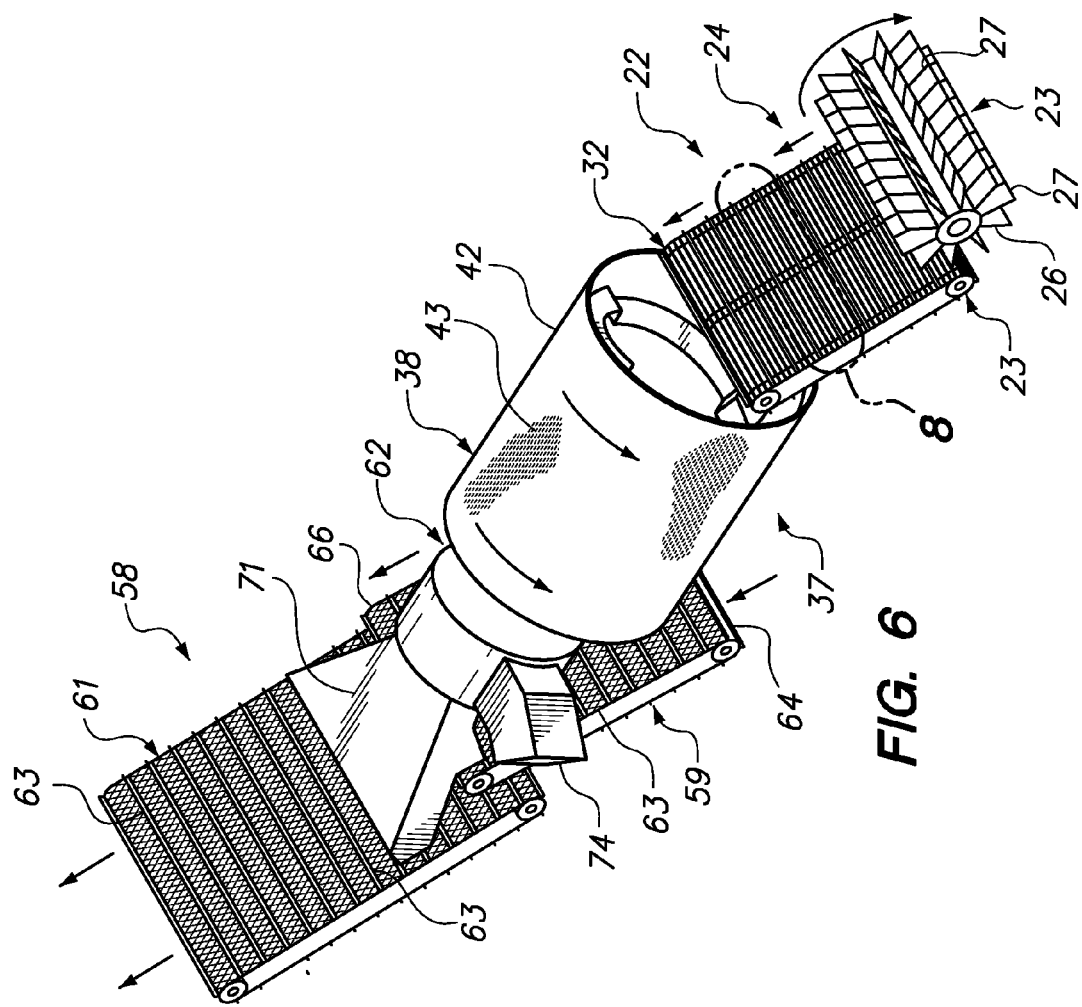
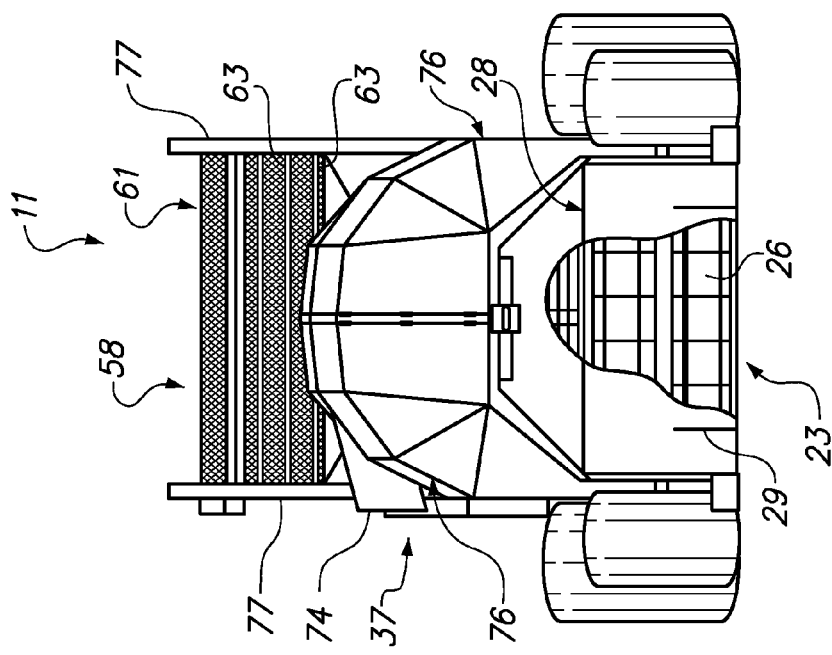

NUT TREE PICKUP AND DEBRIS SEPARATOR

BACKGROUND OF THE INVENTION

1. Field of the Invention

The invention relates generally to improvements in agricultural harvesters for picking up nut produce and entrained orchard debris from windrows, and then separating the debris from the nuts so the latter can be further processed for storage and consumption. More particularly, the invention disclosed herein includes a harvester having three discrete but serially interconnected apparatus stages, each stage having components uniquely adapted for rapid and effective nut pickup and debris separating processes.

2. Description of the Prior Art

U.S. Pat. No. 2,916,868, granted to Ramacher et al., discloses a Nut Windrower. After nuts have fallen to the floor of an orchard, this device is driven through the orchard to sweep the nuts and other material on the orchard floor into elongated windrows, centrally positioned between rows of trees. At the time of harvest, an entire growing season of debris has collected on the orchard floor, making the composition of the windrows a random collection of nuts, leaves, twigs, clods, and the like. To complete this phase of the harvest, the windrows must then be picked up from the orchard floor, and the nuts separated from all of the aforesaid debris.

For that purpose, the Nut Harvester shown in U.S. Pat. No. 3,182,437, issued to Ramacher et al., was developed. The device disclosed in the '437 patent includes pickup means to lift material from windrows and deposit it on an endless conveyor 18. The material is transported and then deposited upon a screen conveyor 21, having openings designed to pass small pebbles and clods, but to retain almonds or other harvested nuts. At the other end of the screen conveyor is a pickup station including intake nozzles 37 and 38. Air flow through the nozzles entrains the nuts and leaves behind the heavier debris material. A vortical air separator 59 acts further to remove lighter debris which may still remain traveling with the nuts. As shown in FIG. 3, substantially only nuts pass by gravity to the bottom of separator 59, to be delivered eventually to an inclined chain conveyor 101.

Another design for harvesting nuts is illustrated in Harvester Pickup, made the subject of U.S. Pat. No. 3,872,657, granted to Ramacher, et al. This arrangement uses a primary brush and a counter-rotating secondary brush to pick up the material from the orchard floor, previously swept into windrows. The materials are hurled into a reflecting panel and dropped onto the lower end of a primary conveyor. A stream of air passes over the primary conveyor, removing lighter material and discharging it into the atmosphere. The remaining heavier material is discharged off the upper end of the primary conveyor into a vertically extending separator column. An upwardly extending draft of air passing through the column, acts upon lighter, irregularly shaped objects and discharges them into the atmosphere. Heavier, more uniformly shaped objects, namely, the nuts, pass downwardly, and are deposited onto an inclined secondary conveyor, and eventually into a collection bin, at the rear end of the harvester.

A single stage Trash Separator For Nut Harvester is taught in U.S. Pat. No. 4,642,977, issued to Ramacher. As shown most clearly in FIG. 3, primary and secondary counter-rotating reels 29 and 32, pick up the nuts and debris and tosses them upwardly. A tertiary pick-up reel 36 assists in keeping the material suspended as it enters the volume of a plenum 23. A chain conveyor 39 extends from the lower end to the upper end of plenum 23. A suction fan 49 has an inlet 54 in communication with a suction tube 56 which spans an upper portion of the plenum. The suction fan 49 also includes an outlet that discharges directly to the atmosphere. Screens 68 are provided on either side of the lower end of plenum 23. In a primary separation zone 66, air is sucked in through the openings in the screen, to engage leaves and other light debris. This debris is discharged by the fan. Gravity tends to make the remainder of the material fall onto the lower end of the conveyor belt 39. As the blanket of material passes up the conveyor, it reaches an area where the vacuum builds, causing a strong updraft which lifts the more aerodynamically responsive trash, but allows the nuts to rejoin or remain on the conveyor. The nuts pass upwardly on the conveyor, past a quiescent zone 77, and eventually into a storage bin 50.

U.S. Pat. No. 5,001,893, issued to Stanley, et al., discloses a Tractor Powered Nut Harvester. This harvester uses a suction fan and a housing mounted at the center of the front end of the harvester frame. Attached to the fan housing and extending rearwardly therefrom is an elongated vacuum chamber. The rear end of the vacuum chamber is in communication with a debris separation chamber. A rotary pickup mechanism deposits the windrow material onto the lower end of an upwardly inclined crop pick-up conveyor, adjacent the ground. The upper end of the crop-pickup conveyor deposits material onto the lower end of an upwardly inclined dirt removal conveyor. Debris drops through these two conveyors, as the material progresses rearwardly through the harvester. The upper end of the dirt removal conveyor is located within the debris separation chamber, and deposits material onto the lower end of an upwardly inclined off-load elevator. The lighter and more irregularly shaped debris is captured by the vacuum within the debris separation chamber, and drawn through the vacuum chamber, eventually to be discharged into the air.

In contrast to the above-discussed prior art, it is an object herein to provide a nut harvester having three separate but operationally related mechanisms, to pick up and clean windowed nut product.

It is a further object herein to provide a nut harvester having a rotary drum cleaner between a nut pickup apparatus and a tandem conveyor belt elevator with a vacuum cleaning fan.

It is yet a further object herein to provide a nut harvester with a rotary drum cleaner using the combination of tumbling action, size segregating slots, and gravity, to remove a high percentage of the debris entrained with the nuts.

It is another object herein to minimize the size and power of the vacuum cleaning fan used to remove debris from the tandem conveyor belt elevator in a nut harvester, to reduce the amount of dust and particulate matter discharged by the harvester into the ambient air.

These and other objects will become apparent in the specification and the detailed description of the preferred embodiment, to follow.

SUMMARY OF THE INVENTION

A nut tree pickup and debris separator, comprising three separate but serially interconnected apparatus stages, is mounted on a mobile frame. The mobile frame is preferably adapted to be pulled by a tractor through a nut tree orchard, but it may include drive and steering means for independent mobility, as well. Each of these apparatus stages includes structural and functional features optimized for nut harvesting.

The first stage includes a rotary pickup paddle and an endless pickup conveyor. The rotary paddle, having a lower edge adjacent the orchard floor, picks up material containing nuts and other debris previously formed into a windrow. The material is flung by the rotary paddle onto the input end of the pickup conveyor. This conveyor is inclined upwardly, from its lower input end to its upper output end, and is constructed from a plurality of parallel bars with flights therebetween. The bars are arranged in spaced relation to retain nuts on the conveyor's upper surface, and to allow smaller debris to pass therethrough, directly onto the orchard floor. Thus, the first stage performs the functions of picking up the windrowed material, and performing an initial stage of nut cleaning and debris removal.

The second stage comprises a rotating cleaning drum, having a lower inlet end and a higher outlet end. The inlet end is adjacent and beneath the output end of the pickup conveyor, receiving nuts and debris material therefrom. The drum has a right-circular cylindrical sidewall, which includes a plurality of elongated apertures, sized to retain nuts and pass debris. The inner wall of the sidewall includes a helical flight, extending from the inlet end to the outlet end. The flight is sized, configured, and arranged to convey and tumble nuts and debris through the drum, with debris falling through the apertures in the drum sidewall. The helical flight includes a plurality of steps, or discontinuities in the path of the flight, which assist in transporting the nuts and debris up the drum more efficiently. The function of the rotary drum is to separate the bulk of the debris from the nuts, so that any further downstream cleaning of the nuts is minimal and easily accomplished.

The third stage includes vertically and horizontally offset tandem conveyors, and a cleaning fan. The tandem conveyors are foraminous, preferably made from a steel mesh material. The first conveyor is inclined upwardly, having a lower intake end and an upper discharge end. The first conveyor's intake end is located adjacent and beneath the outlet end of the cleaning drum. The second conveyor is also inclined upwardly, having a lower feed end and an upper drop end. The discharge end of the first conveyor is arranged above the feed end of the second conveyor, so that nuts and material from the first conveyor drop downwardly toward the feed end of the second conveyor. The third stage further includes a cleaning fan having shroud with a suction side adjacent the discharge end of the first conveyor and the feed end of the second conveyor, to remove any remaining debris from the nuts as they free fall from the discharge end onto the feed end.

Typically, a mobile storage bin is towed behind the rear end of the nut harvester, so that nuts free from any debris fall off the drop end of the second conveyor into the storage bin for collection and subsequent processing.

BRIEF DESCRIPTION OF THE DRAWINGS

FIG. 3 is a fragmentary, perspective view of the rotary cleaning drum, a portion of the helical flight inside the drum being shown in broken line;

FIG. 3a is a fragmentary, detail inset view, showing the shape and orientation of the elongated slots in the sidewall of the drum FIG. 4 is a fragmentary, perspective view of the helical flight of the rotary cleaning drum, showing the steps, or discontinuities, in the path of the flight;

FIG. 5 is a front elevational view of the apparatus, a portion of the windrow curtain being broken away to show a portion of the rotary pickup paddle and a portion of the pickup conveyor;

FIG. 6 is a right front perspective view, depicting the basic components and serial arrangement of the first, second, and third stages of the apparatus;

DETAILED DESCRIPTION OF THE PREFERRED EMBODIMENT

Figure 1:
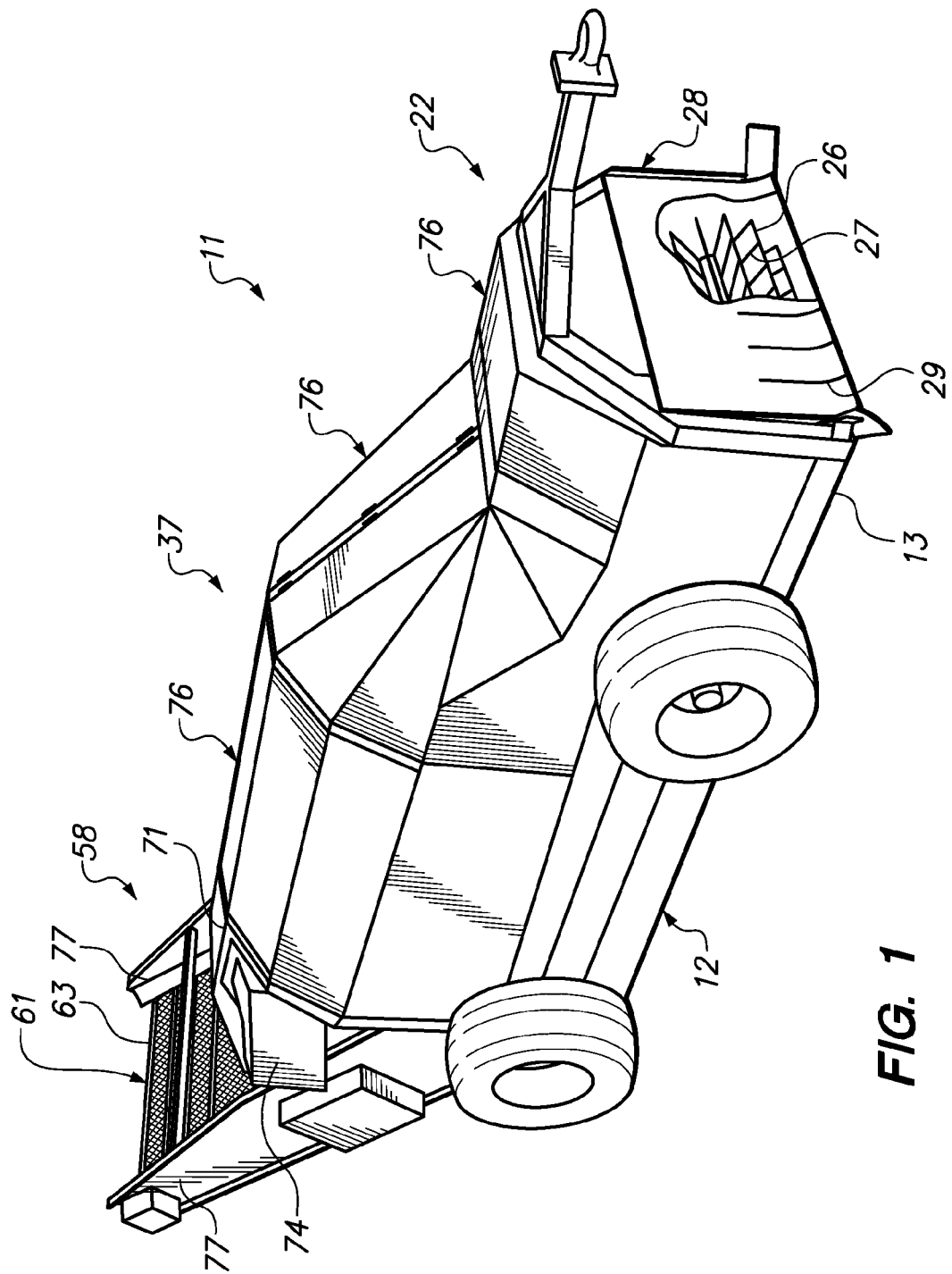
FIG. 1 is a right front perspective of the nut tree pickup and debris separator apparatus, a portion of the flexible front windrow curtain being broken away to show the rotary pickup paddle therein.
Figure 9:
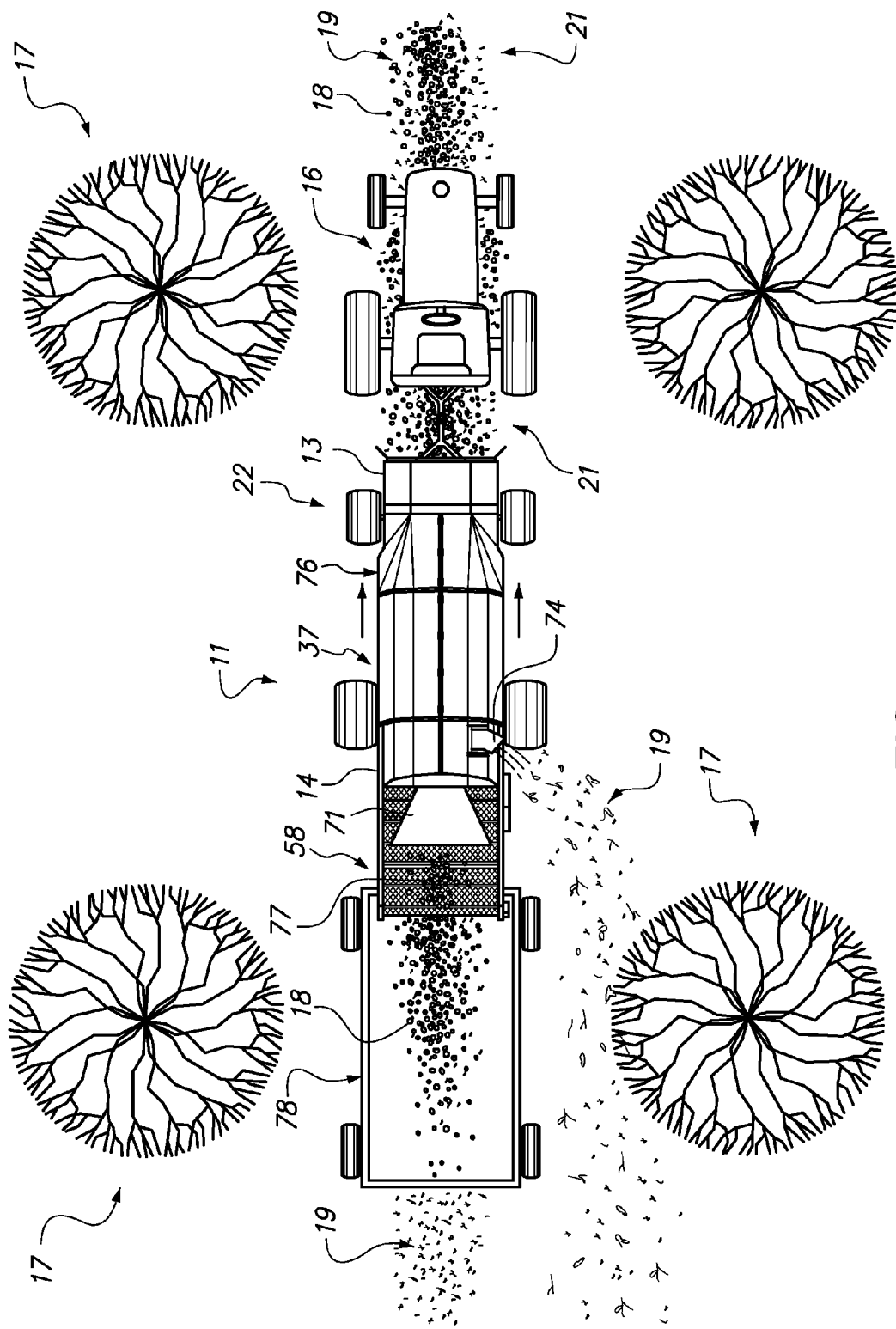

Turning now to the drawings, FIG. 1 shows the apparatus 11 of the present invention, comprising a nut tree pickup and debris separator. Apparatus 11 includes three separate, but serially interconnected stages, mounted on a mobile frame 12. The mobile frame 12 has a front end 13, a rear end 14, and is preferably adapted to be pulled by a tractor 16 through a nut tree orchard 17, as shown in FIG. 9. However, the mobile frame 12 may include on-board drive and steering means for independent mobility, as well.

At the end of the growing season, and after the nuts 18 have naturally dropped or been shaken loose from the trees, the orchard floor is covered with a combination of debris 19 and nuts 18. The debris 19 may include leaves, twigs, dirt clods, and rocks. A brush and sweeping apparatus, such as that disclosed in U.S. Pat. No. 2,916,868, makes repeated passes through the orchard to form elongated windrows 21 from the commingled debris 19 and nuts 18. The primary task of the apparatus 11 is to pickup from the orchard floor substantially all of the material contained in the windrows 21, and then separate or remove the debris 19 from the nuts 18, so the nuts can be collected and transported elsewhere for further processing. The debris is returned to the floor of the orchard 17, and is usually plowed back into the soil or burned at a later time.

As shown in FIG. 6, the first stage 22 includes a rotary pickup paddle 23 and an endless pickup conveyor 24. The rotary paddle 23, has a plurality of radially extending, flexible rubber flaps 26. The flaps 26 include a plurality of transverse slits 27 arranged in spaced relation along their length, to make the flaps 26 more effective at picking up material having different heights or densities. The slits 27 are also effective at relieving stress along each flap 26 as it encounters the windrow 21.

A flexible rubber curtain 28 is positioned in front of the rotary paddle 23, extending across the front end 13 of the apparatus 11. (See, FIGS. 1 and 5). Curtain 28 also includes vertical slits 29 extending along its lower portion. As the apparatus 11 is pulled forwardly over the windrow 21, the material encounters the curtain 28 which acts to level and spread the material more evenly before it encounters the rotary paddle 23.

Figure 7:
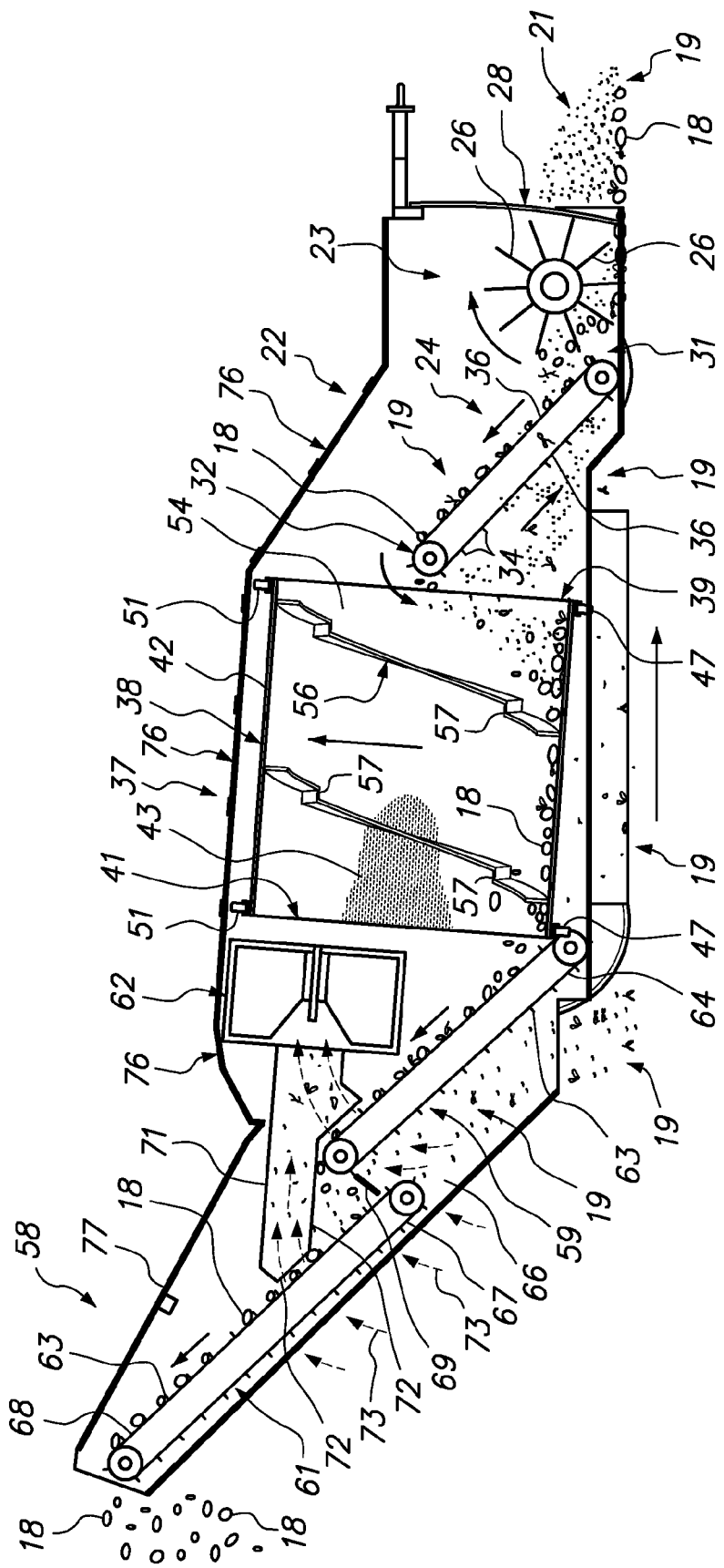
FIG. 7 is a fragmentary, cross-sectional view, taken on the line 7-7, in FIG. 2.
Figure 8:
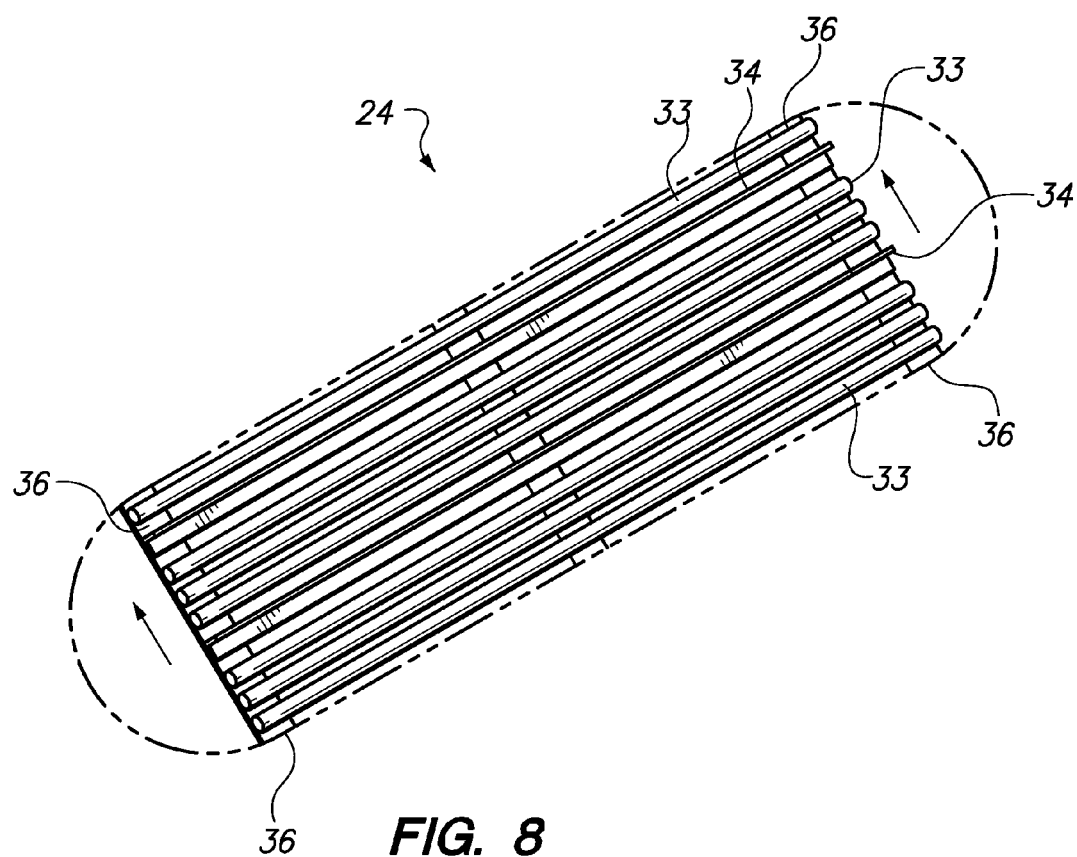
FIG. 8 is a fragmentary, perspective view of a portion of the pick up conveyor, identified by the broken line 8 in FIG. 6, showing the plurality of bars and flights; and, FIG. 9 is a top plan view of the apparatus of the present invention in operation in an orchard setting, a tractor pulling the apparatus over the center line of a windrow, discharging debris onto the ground and passing nuts off the end of the second tandem conveyor into a towed bin.

As viewed in FIG. 7, the rotary paddle 23 is driven in clockwise fashion by conventional means, such as a hydraulic motor. The lower edges of flaps 26 successively sweep across the orchard floor, picking up the nuts 18 and the debris 19, previously formed into the windrow 21. The material is thereby flung upwardly and rearwardly by the rotary paddle 23, onto an input end 31 of the pickup conveyor 24.

Pickup conveyor 24 is inclined upwardly and rearwardly, from its lower input end 31 to an upper output end 32. Conveyor 24 is constructed from a plurality of parallel bars 33 with flights 34 arranged therebetween. The bars 33 are made from a rigid rod or tube, surrounded by foam or rubber to provide a resilient, gripping surface. The bars 33 are arranged in spaced relation to retain nuts 18 on the conveyor's upper surface, and to allow smaller debris 19 to pass therethrough, falling directly onto the orchard floor. The space between adjacent bars 33 is selected to prevent the passage of an average size for the particular nuts 18 being harvested, so it will be different for walnuts, pecans, or almonds, for example.

The flights 34 may be manufactured from angle iron, having a horizontal portion generally lying in the plane of the lower edges of the bars 33, and a vertical portion, extending above the upper edges of the bars. An endless, parallel drive belt 36 is located at each outer side of the conveyor 24. The ends of bars 33 and flights 34 are bolted to a respective drive belt 36, providing support and drive force for these components.

The flights 34 work in conjunction with the bars 33, to move the previously windrowed material upwardly and rearwardly through the apparatus 11, while allowing a certain amount of debris 19 to be removed from the material as it is transported. Thus, the first stage 22 performs the functions of picking up the windrowed material from the orchard floor, and performing an initial stage of nut cleaning and debris removal. A second stage 37 comprises a rotating cleaning drum 38, being slightly upwardly and rearwardly inclined, as shown in FIG. 7. Drum 38 has a lower inlet end 39 and a higher outlet end 41. The inlet end 39 is adjacent and beneath the output end 32 of the pickup conveyor 24, for receiving nuts 18 and debris 19 dropping off the output end 32. Cleaning drum 38 has a right-circular cylindrical sidewall 42, which includes a plurality of elongated apertures 43, sized to retain nuts 18 and to pass debris 19. For purposes of clarity, only a portion of the apertures 43 is shown in FIGS. 3 and 7, but it should be understood that the entire sidewall 42 includes apertures 43. Each of the apertures 43 has an elongated axis which is parallel to an axis of rotation 44, of the drum 38. (See, FIG. 3a). It has been determined that this orientation for apertures 43 is optimal for removal of debris 19, compared to a circumferential orientation for the axes of the apertures 43. As with the spacing between the bars 33 in the first stage 22, the transverse dimension of each aperture 43 is selected to retain an average sized nut 18, allowing smaller debris 19 to pass therethrough and fall to the orchard floor.

For the purpose of supporting and driving drum 38 for rotation, drive rollers 46 and idler rollers 47 are provided on opposing, lower sides of the drum 38. The drive rollers 46 are connected by a common drive shaft 48, which is connected at one end to a conventional hydraulic motor 49. For further stability, pairs of guide rollers 51 are provided at the upper portion of each end of the drum 38. A front circumferential channel 52 and a rear circumferential channel 53 are provided on the outer sidewall of the drum, for rolling engagement by rollers 46, 47, and 51. Drum 38 is thereby driven in counter-clockwise fashion, when viewed from the lower, inlet end 39 of the drum 38, as shown in FIG. 3.

The inner wall 54 of the sidewall 42 includes a helical flight 56, extending from the inlet end 39 to the outlet end 41. The helical flight 56 is sized, configured, and arranged to convey and tumble nuts 18 and debris 19 upwardly and rearwardly through the drum 38, with debris 19 falling through the apertures 43 in the drum sidewall 42 during that process. The helical flight 56 includes a plurality of steps 57, or discontinuities in the path of the flight, which assist in transporting the nuts 18 and the debris 19 up the drum more efficiently. The steps 57 lie in a plane generally parallel to the axis of rotation 44 of the drum, as shown in FIGS. 3 and 4, but that specific orientation is not critical. The steps 57 effectively break up the material passing through the drum 38 into groups that move progressively upwardly along the bottom portion of the inner wall 54, as the drum 38 rotates. The function of the second stage 37, and in particular the rotary drum 38, is to separate the bulk of the debris 19 from the nuts 18, so that any further downstream cleaning of the nuts 18 is minimal and easily accomplished.

A third stage 58, located at the rear end 14 of apparatus 11, includes vertically and horizontally offset tandem conveyors 59 and 61, and a cleaning fan 62. The conveying surfaces of tandem conveyors 59 and 61 are foraminous, preferably made from a steel mesh material. Both conveyors include transversely oriented flights 63, arranged in spaced relation along the endless conveyors.

The first conveyor 59 is inclined upwardly and rearwardly, having a lower intake end 64 and an upper discharge end 66. The first conveyor's intake end 64 is located adjacent and beneath the outlet end 41 of the cleaning drum 38. Nuts 18 and any remaining debris 19, fall under gravity from the outlet end 41 onto the intake end 64. It should be noted that small debris 19 falls through the foraminous mesh of conveyor 59, and is discharged onto the ground. See, FIG. 7.

The second conveyor 61 is also inclined upwardly and rearwardly, having a lower feed end 67 and an upper drop end 68. The upper discharge end 66 of the first conveyor 59 is arranged above the lower feed end 67 of the second conveyor 61, so that nuts 18 and any debris 19 remaining on the first conveyor 59 drop downwardly under gravity toward the feed end 67 of the second conveyor 61. A resilient rubber flap 69 extends downwardly from the upper discharge end 66 of the first conveyor 59 to a region immediately above the surface of second conveyor 61, to prevent nuts 18 and debris 19 from falling off the lower feed end 67 of second conveyor 61.

As mentioned, the third stage 58 further includes a cleaning fan 62 having shroud 71 with a suction side 72 adjacent the discharge end 66 and the feed end 67 to remove any remaining debris 19 from the nuts 18 as they free fall from the discharge end 66 of the first conveyor 59 onto the feed end 67 of the second conveyor 61. Cleaning fan 62 is preferably of the centrifugal variety, although any fan of sufficient suction power would be suitable. It should be noted that the suction from fan 62 causes air, represented by arrows 73, to be drawn upwardly beneath an underlying portion of second conveyor 61. The air passes through the mesh material, having a force sufficient to uplift any remaining leaves, twigs, and other debris 19, but not affecting the upward conveyance of nuts 18. The uplifted debris 19 passes through the fan 62, and is passed outwardly from the apparatus 11 onto the orchard floor, through a lateral discharge duct 74.

Because all of the previous cleaning stages of the apparatus 11, and in particular second stage 37, are so effective at separating and removing debris 19 from the nuts 18, there is very little debris 19 left for the cleaning fan 62 to remove. As a consequence, cleaning fan 62 can be of a substantially smaller size and power to be effective in its role. This also means that less dust is contained within the material outputted through discharge duct 74, meeting another objective of the present apparatus 11, which is to reduce air pollution during the nut harvesting process.

Figure 2:
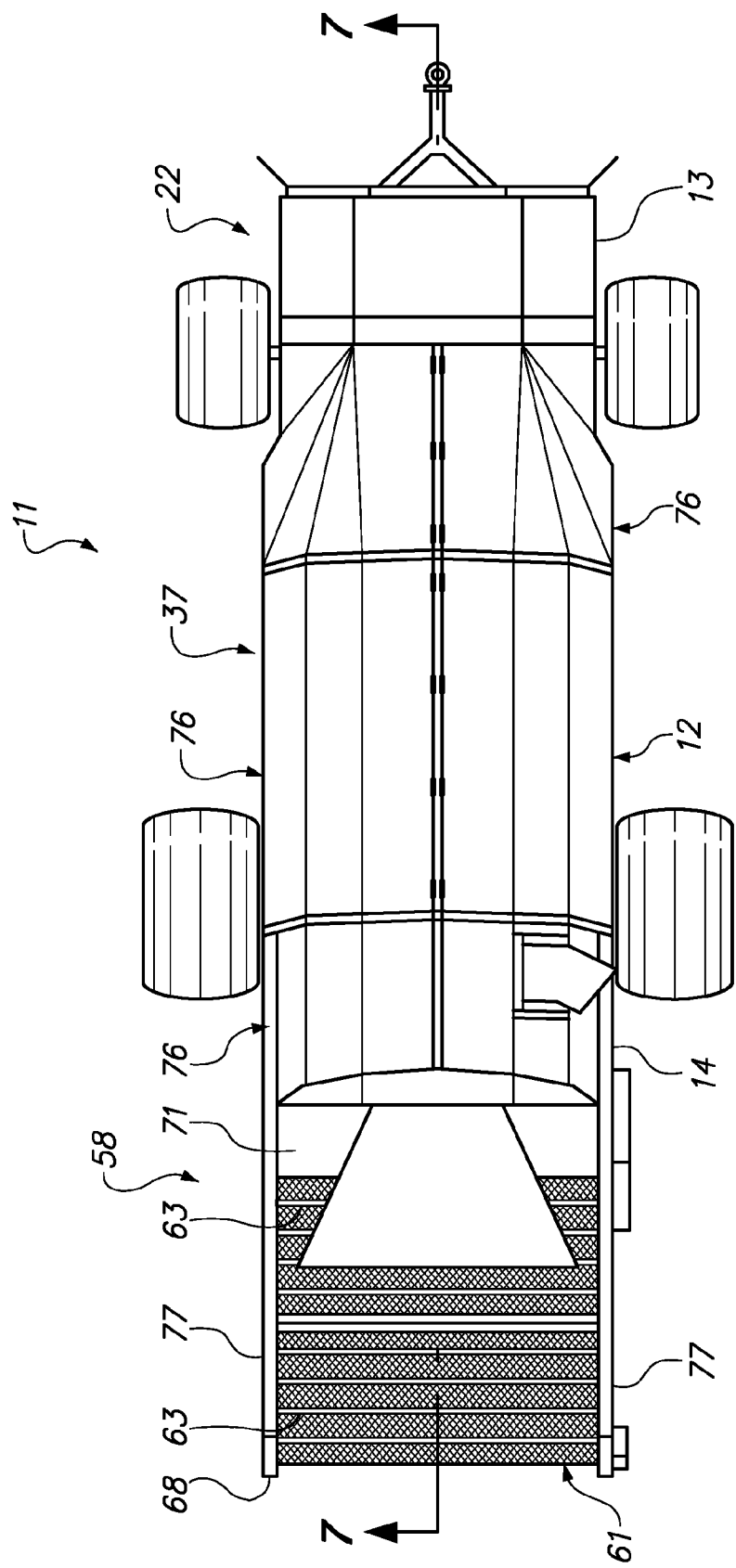
FIG. 2 is a top plan view of the apparatus of the present invention.

As is most evident in FIGS. 1 and 2, shrouds 76 cover first stage 22, second stage 37, and the cleaning fan 62 in the third stage 58. The panel elements of the shrouds 76 assume various configurations depending upon the size and configuration of the underlying mechanisms, and some of them are hinged for easy access to the mechanisms for service. The shrouds 76 have a safety function, but they also serve to keep dust and debris contained, again to minimize the amount airborne matter produced by harvesting. Lateral panels 77 are provided on either side of the second conveyor 61, to confine nuts 18 and debris 19 as they undergo the final separation and cleaning operation.

A mobile storage bin 78 may be provided for the purpose of collecting nuts 18. Typically, bin 78 includes a detachable hitch (not shown), for selective attachment to the rear end 14 of the apparatus 11. Thus, as the apparatus 11 progresses through the nut tree orchard 17, nuts 18 free from any debris 19, fall off the drop end 68 of the second conveyor 61, into the storage bin 78 for collection and subsequent processing. After the bin 78 is full, it is detached from the apparatus and towed by tractor or other vehicle to a processing facility.

What is claimed is:

1. A nut tree pickup and debris separator, comprising:
   a. an elongated mobile frame, said frame having a front end and a rear end;
   b. a first stage including a rotary pickup brush and an endless pickup conveyor mounted on said front end of said frame, said conveyor being inclined upwardly from a lower input end to a higher output end, said conveyor including plurality of parallel bars with flights therebetween, said bars being arranged in spaced relation sufficient to retain nuts and pass debris, said pickup brush engaging a windrow including nuts and debris and depositing them onto said input end of said conveyor;
   c. a second stage located on said frame intermediate said front end and said rear end, said second stage comprising an elongated drum having an axis of rotation and means for rotating said drum about said axis, said drum being inclined upwardly from a lower inlet end to a higher outlet end, said inlet end being adjacent and beneath said output end of said pickup conveyor to receive nuts and debris therefrom, said drum having a right-circular cylindrical sidewall with an inner side and an outer side, said sidewall including a plurality of elongated apertures passing therethrough, said apertures being arranged in parallel relation to said axis of rotation and being sized to retain nuts and pass debris, said inner side of said drum having a helical flight extending generally from said inlet end to said outlet end, said helical flight conveying and tumbling nuts and debris upwardly through said drum, with debris falling through said apertures; and,
   d. a third stage including horizontally and vertically offset tandem conveyors, a first conveyor of said tandem conveyors being inclined upwardly and having a lower intake end and an upper discharge end, said intake end being located adjacent and beneath said outlet end of said drum to receive nuts and debris therefrom, a second conveyor of said tandem conveyors being inclined upwardly and having a lower feed end and an upper drop end, said discharge end of said first conveyor being arranged above said feed end of said second conveyor, said third stage further including a cleaning fan having a suction side adjacent said discharge end and said feed end to remove any remaining debris from the nuts as they fall from said discharge end of said first conveyor onto said feed end of said second conveyor.

2. An apparatus as in claim 1 in which said mobile frame includes a tow bar at said forward end.

3. An apparatus as in claim 1 in which said helical flight has a lower leading end and an upper trailing end, and in which at least one step exists between said lower leading end and said upper trailing end of said flight.

4. An apparatus as in claim 3 in which said helical flight includes a plurality of said steps arranged in spaced relation along a path of said flight extending from said leading end to said trailing end, each of said steps presenting an upwardly directed discontinuity in said path.

5. An apparatus as in claim 1 in which said bars are coated with a resilient material, and in which said flights extend across and perpendicularly from a surface of said pickup conveyor.

6. An apparatus as in claim 1 including a flexible curtain forward from said rotary pickup brush.

7. An apparatus as in claim 1 in which a transverse dimension for said elongated apertures is smaller than a shortest average transverse dimension for the harvested nut.

8. An apparatus as in claim 7 in which the harvested nut is either an almond, or a walnut, or a pistachio, or a pecan, or a peanut.

9. An apparatus as in claim 1 in which said tandem conveyors are foraminous, allowing air to pass therethrough.

10. An apparatus as in claim 1 further including a bin attached to said rear end of said frame, said bin having an open top below said drop end of said second conveyor.

11. A nut tree pickup and debris separator, comprising:
    a. an elongated mobile frame, said frame having a front end and a rear end;
    b. pickup and cleaning means located on said front end of said frame, said pickup and cleaning means including a rotating brush and a conveyor for engaging and picking up material from a windrow including nuts and debris and conveying the material over a surface having openings small enough to prevent nuts from passing through said openings;
    c. an elongated drum located on said frame intermediate said front end and said rear end, said drum having an axis of rotation and means for rotating said drum about said axis, said drum being inclined upwardly from a lower inlet end to a higher outlet end, said inlet end being adjacent and beneath an output end of said pickup and cleaning means, said drum having a right-circular cylindrical sidewall with an inner side and an outer side, said sidewall including a plurality of elongated apertures passing therethrough, said apertures being arranged in parallel relation to said axis of rotation and being sized to retain nuts and pass debris, said inner side of said drum having a helical flight extending generally from said inlet end to said outlet end, to convey and tumble debris through the said drum, with debris falling through said apertures; and,
    d. tandem conveyors, said tandem conveyors being located on said rear end of said frame, a first conveyor of said tandem conveyors being inclined upwardly and having a lower intake end and an upper discharge end, said intake end being located adjacent and beneath said outlet end of said drum, a second conveyor of said tandem conveyors being inclined upwardly and having a lower feed end and an upper drop end, said discharge end of said first conveyor being arranged above said feed end of said second conveyor, said third stage further including a cleaning fan having a suction side adjacent said discharge end and said feed end to remove any remaining debris from the nuts as they fall from said discharge end of said first conveyor onto said feed end of said second conveyor.

12. An apparatus as in claim 11 in which said mobile frame includes a tow bar at said forward end.

13. An apparatus as in claim 11 in which said helical flight has a lower leading end and an upper trailing end, and in which at least one step exists between said lower leading end and said upper trailing end of said flight.

14. An apparatus as in claim 11 in which said helical flight includes a plurality of said steps arranged in spaced relation along a path of said flight extending from said leading end to said trailing end, each of said steps presenting an upwardly directed discontinuity in said path.

15. An apparatus as in claim 11 in which a transverse dimension for said elongated apertures is smaller than a shortest average transverse dimension for the harvested nut.

16. An apparatus as in claim 15 in which the harvested nut is either an almond, or a walnut, or a pistachio, or a pecan, or a peanut.

17. An apparatus as in claim 11 in which said tandem conveyors are foraminous, allowing air to pass therethrough.

18. A method for picking up nuts and debris from a windrow, and separating the nuts from the debris, comprising the steps of:
   a. continuously moving through an orchard over a windrow formed from nuts and debris;
   b. continuously picking up the nuts and debris from successive portions of the windrow;
   c. continuously depositing the picked up nuts and debris onto a pickup conveyor, said pickup conveyor size separating nuts from debris smaller than the nuts, while transporting the nuts upwardly and depositing a first portion of the debris onto the ground;
   d. continuously depositing the nuts and a first remaining portion of the debris from an upper end of the pickup conveyor into a drum, said drum size separating nuts from debris smaller than the nuts, while tumbling the nuts and transporting the nuts upwardly and depositing a second portion of the debris onto the ground;
   e. continuously depositing the nuts and a second remaining portion of debris from an upper end of the drum onto a first tandem conveyor, said first tandem conveyor size separating nuts from debris smaller than the nuts and transporting the nuts upwardly, while depositing a third portion of the debris onto the ground;
   f. continuously passing the nuts and a third remaining portion of the debris off an upper end of said first tandem conveyor;
   g. providing a second tandem conveyor having a feed end below said upper end of said first tandem conveyor; and,
   h. providing an upward air current around said upper end of said first tandem conveyor and said feed end of said second tandem conveyor, said air current entraining and separating said third remaining portion of debris from the nuts, and discharging said third remaining portion onto the ground, said second tandem conveyor continuously receiving nuts from said first tandem conveyor and transporting them for collection in a bin.

19. A method as in claim 18 in which said upward air current is provided by a centrifugal fan.

\* \* \* \* \*